Feb. 17, 1931.  H. SKARL  1,792,936

THREAD GAUGE

Filed Nov. 25, 1927

Inventor
Henry Skarl
By
His Attorney

Patented Feb. 17, 1931

1,792,936

UNITED STATES PATENT OFFICE

HENRY SKARL, OF CLEVELAND, OHIO, ASSIGNOR TO HANSON-WHITNEY MACHINE COMPANY, OF HARTFORD, CONNECTICUT, A CORPORATION OF CONNECTICUT

THREAD GAUGE

Application filed November 25, 1927. Serial No. 235,472.

This invention relates to thread gauges. In the present illustrative disclosure, the invention is shown as incorporated in a device for gauging pipe threads to which use it is peculiarly adapted. It will be understood, however, that the present disclosure is by way of illustration only, as the invention is susceptible of other embodiments and applications than those herein shown.

An aim of the invention is to provide a gauge which is very simple in construction, which may be very cheaply and accurately made, and which is very convenient and effective in use. By employing my improved gauge, the accuracy of the threads to be gauged may be very readily and quickly determined in all particulars, such as size, shape and lead.

Other objects will be in part obvious and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the accompanying drawings, wherein I have shown, for illustrative purposes, one embodiment which the present invention may take:

Figure 1:
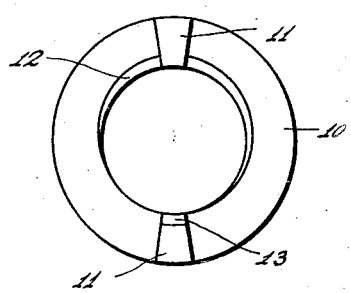
Figure 1 is an elevational view looking at the end of the gauge.

In accordance with the present invention, the gauge is provided with a cylindrical or ring-like portion 10 and one or more relatively narrow and longitudinally extending arms or fingers 11. Preferably, there are two such fingers diametrically disposed relative to one another. On the inside face or periphery of the ring is a screw thread 12 which corresponds to the desired thread to be gauged. On the inner faces of the arms 11 are serrations or teeth 13 which are sections of a thread corresponding to the thread 12. In the present instance, these serrations are of the same size, shape, lead and pitch as the thread 12, as shown most clearly in Fig. 2. When my improvements are incorporated in a pipe gauge, the inner periphery of the ring 10 and the serrated faces of the arms 11 are inclined or tapered in accordance with the taper of the thread to be gauged.

Figure 2:
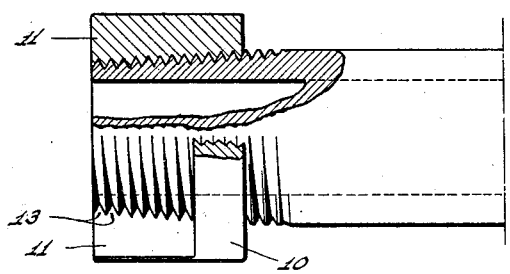
Fig. 2 is a side view of my improved gauge and a pipe being gauged thereby, portions of the gauge and pipe being broken away.
Figure 3:
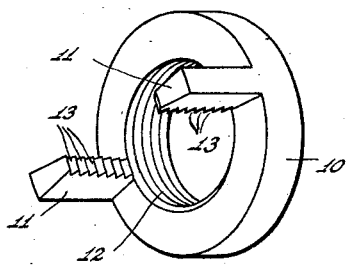
Fig. 3 is a perspective view of the gauge.

From the foregoing description, taken in connection with the accompanying drawings, it will be seen that my improved gauge is very simple in construction and may be economically manufactured. The thread of the ring and the arms may be formed in a single operation. The gauge is very effective in use, as it is merely necessary to screw the gauge onto the pipe to be threaded to determine whether the pipe thread is of the correct diameter. After the gauge has been threaded onto the pipe, as shown in Fig. 2, the gauge may be held between a source of light and the eye in order to determine whether the convolutions of the thread are accurate as to shape, size and pitch. If the thread is inaccurate, an undue amount of light can be observed between the serrations on the gauge and the thread on the pipe.

The ring 10 and its arms 11 are relatively rigid so as to hold the master threads in unyielding form, and the arms 11 are not deformable after the gauge is in place.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. A thread gauge having a ring portion, and a rigid arm extending from said ring portion in a direction parallel to the axis thereof, the inner face of said arm and the inner periphery of said ring portion having a master screw thread.

2. A thread gauge having an internally threaded ring, and a substantially non-deformable arm extending from said ring in a direction parallel to the axis thereof and provided on its inner face with serrations constituting sections of a continuation of the thread of the ring.

3. A thread gauge comprising a rigid ring having a pair of rigid narrow arms projecting from one end thereof in a direction parallel to the axis of said ring, said ring being internally threaded and the threads of the ring extending out through the inner edges of the arms to provide rigid narrow segmental portions of the thread of the ring, said ring and arms being adapted to be threaded on a pipe and said segmental thread portions admitting inspection and comparison of the rigid arm threads with the threads on the pipe meshing therewith.

HENRY SKARL.